A. J. Purviance.
Mower.
N° 6,476.   Patented May 22, 1849.
Sheet 2. 2 Sheets
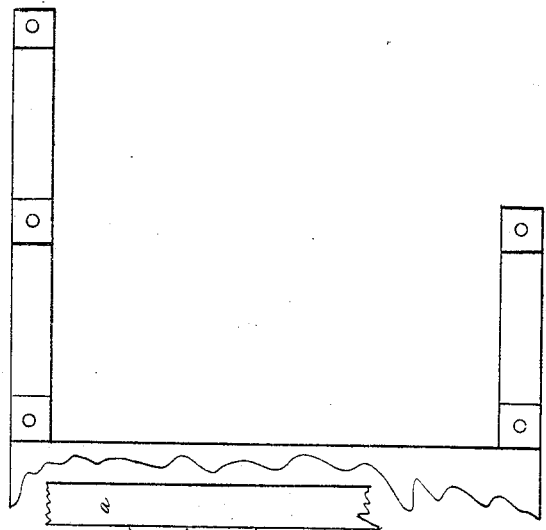
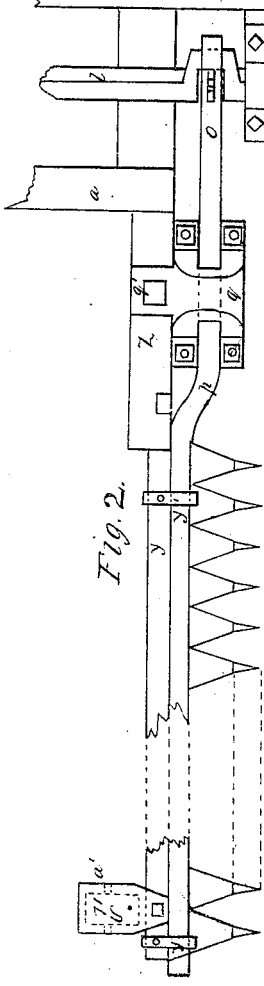
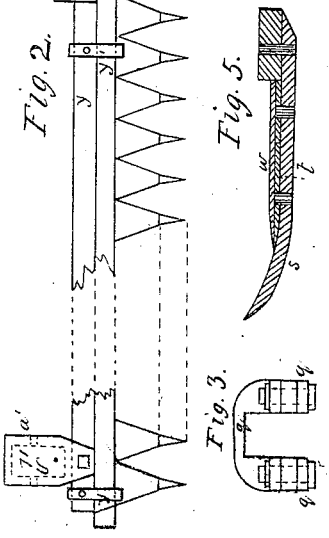
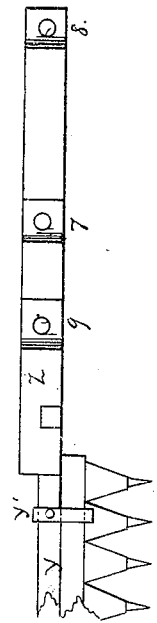
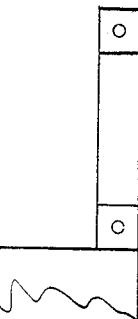

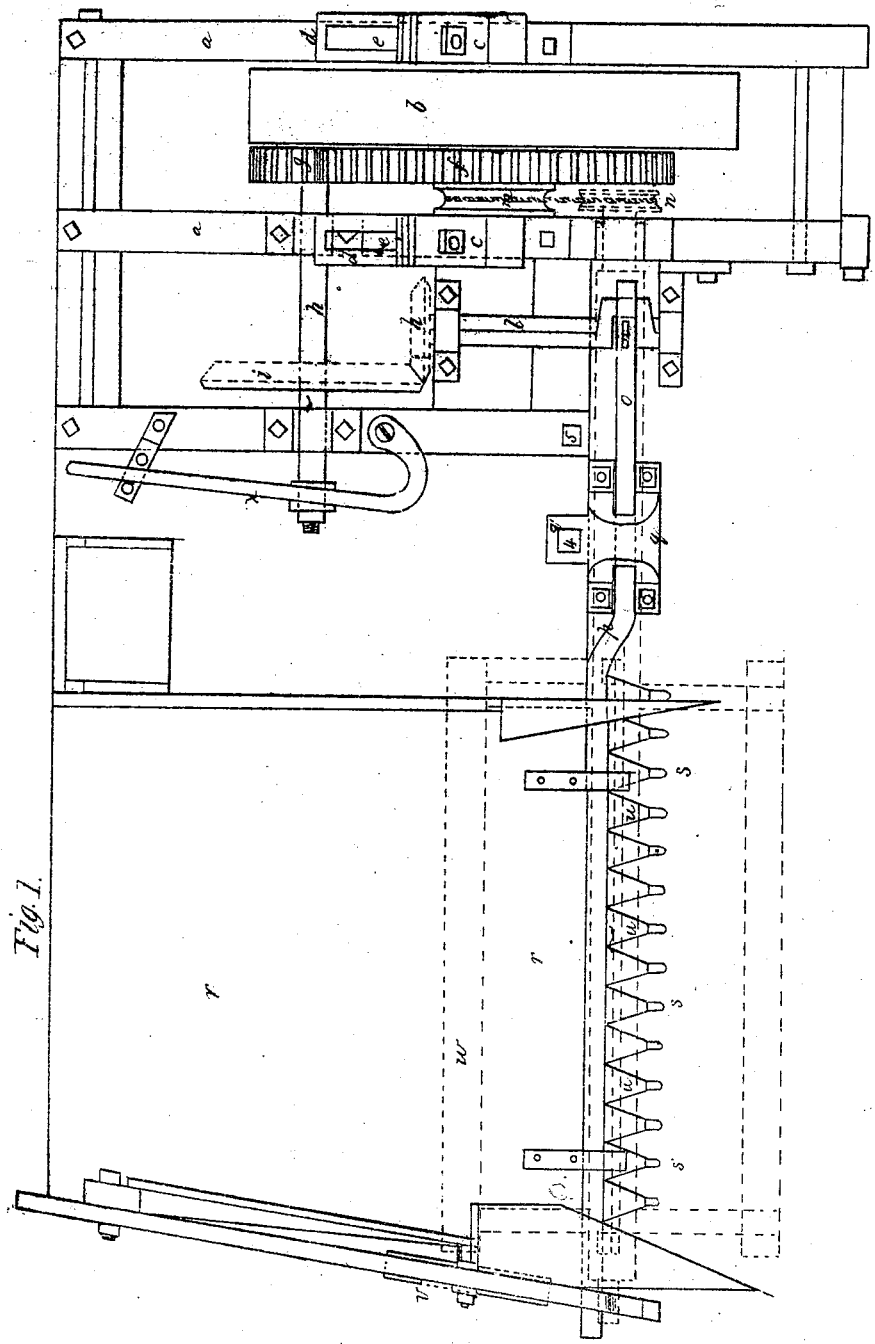

UNITED STATES PATENT OFFICE.

A. J. PURVIANCE, OF UPDEGRAFF, OHIO.

IMPROVEMENT IN HARVESTING-MACHINES.

Specification forming part of Letters Patent No. 6,476, dated May 22, 1849.

*To all whom it may concern:*

Be it known that I, A. J. PURVIANCE, of Updegraff, Jefferson county, and State of Ohio, have made certain new and useful Improvements in the Machine for Reaping and Mowing; and I do hereby declare that the following is a full, clear, and exact description of their nature and construction, reference being had to the accompanying drawings, making part of this specification, in which—

Figure 1 is a plan of the machine when used for reaping, the reel being represented by red lines. Fig. 2 is a plan of part of the machine as used when mowing. Fig. 3 represents the slide detached; Fig. 4, a portion of the platform, showing the mortises; Fig. 5, a cross-section of one of the shields and knives, and Fig. 6 a portion of the mower detached.

The same letters refer to like parts in all the figures.

The nature of my improvement consists, first, in the connection of the movable knives with the gearing by means of a slide made on one end of the bar of iron to which the movable knives are attached, said slide working between ways firmly bolted together and to a platform, and connecting with a pitman-rod, and therefore not liable to become uncoupled, as is the case with many reapers now in use, while at the same time there is much less friction, and hence less wear of materials.

My second improvement consists in the manner of constructing the platform separate from the other frame-work of the machine, whereby the whole of the platform and reel can be removed and the mower attached in a few minutes, ready for mowing.

The construction is as follows:

$a$ represents an oblong frame, consisting of side and end pieces firmly bolted or otherwise secured together. Between the side pieces, and very near the outer one, a large wheel, $b$, travels on the ground, the shaft of which has its bearings in cap-pieces $c$. These cap-pieces are secured to curved standards $d$ by means of screw-bolts and nuts passing through slots $e$ in the standards and through the cap-pieces.

On the shaft of the large wheel $b$, I place a cog-wheel, $f$, of less diameter, which gears into a pinion, $g$, on one end of the shaft $h$. This gives motion to a large bevel-wheel, $i$, placed near its other end, which gears into a beveled pinion, $k$, on the crank-shaft $l$, which has its bearings in suitable boxes attached to the frame-work $a$, as shown clearly in the drawings. There is also on the shaft of the large wheel $b$ a pulley, $m$, around which a band passes to another pulley, $n$, on the reel-shaft, to give it motion. A pitman-rod, $o$, connects in the usual manner with the crank-shaft $l$ to a slide, $p$, formed on one end of the light bar of iron to which the movable knives are bolted. This slide projects out some distance at either end of the knives, so as to play between ways $q$, formed of stout iron, the lower ones being made separately and the upper ones being connected together, as clearly shown in the drawings, Fig. 3, with a space between them for the free movement of the pitman-rod. These ways are firmly bolted together, the upper ones being also bolted to the platform (to be hereinafter mentioned) by the projection $q'$. By this arrangement the connection which gives motion to the movable knives is not liable to become uncoupled, as is ordinarily the case, while the friction is reduced in a great measure, and therefore the parts rendered more durable.

The platform $r$ is made the width of the machine and of any convenient length, having mortises cut at proper places to receive the side pieces of the oblong frame-work $a$, as is clearly shown in the drawings, Fig. 4. These are secured firmly together by screw-bolts and nuts 1 2 3 4 5 6. Along the front edge of this platform I arrange permanently, by bolting them to the platform or in any convenient way, a set of shields, $s$, one for each knife. The knives $t$ are firmly bolted to the shields, (see Fig. 5,) and on these permanent knives $t$ the movable ones $u$ slide, these being likewise bolted to the within-mentioned light bar of iron, one end of which forms the slide, as within described. The knives, when placed together, present the appearance of a saw. Each one is beveled—the permanent ones $t$ on the under side and the movable ones $u$ on the upper side—so that the two flat surfaces coming together form a self-sharpener. At convenient places on the front edge of the platform there are two or more pieces of iron, which extend out in front to keep the movable knives in place.

The end of the platform opposite the large wheel $b$ is supported in its position by a wheel, $v$, moving on the ground. The reel $w$ is placed immediately over the knives to draw the grain on the platform, and is of ordinary construction.

When it is desired to throw the machine out of gear, by moving the lever $x$ on one end of the shaft $h$ the large bevel-wheel $i$ is released from the beveled pinion $k$, and the object is attained.

When it is desired to change the machine so that it can be used for mowing, it is only necessary to remove the screw-bolts and nuts numbered from 1 to 6, then press the side pieces of the frame-work $a$ out of the mortises in the platform, when the platform, with the permanent knives, reel, and pulley on the reel-shaft, can be moved away and the mowing-bar instantly attached. This consists of a long stout bar of iron, $y$, Fig. 2, about two inches wide and one inch thick, to which shields are permanently bolted. On these slides the knives are firmly riveted, and there are also pieces of iron, $y'$, projecting out in front from the top of the bar $y$, to keep the movable cutters or knives from springing up. At one end of this stout bar $y$ a piece of timber, $z$, laps over for some distance, and they are securely bolted together. This piece of timber has two mortises, numbered 7 and 8, cut in it, as shown in the drawings, Fig. 6, to receive the same side pieces of the frame-work $a$ that enter the mortises in the platforms $v$. There is also a third mortise, numbered 9, into which the projection $q'$ on the upper ways fits and is firmly secured. At the other end of this bar $y$ there are arms $a'$, which extend out to the rear and form the bearings of a wheel, $b'$, (shown by dotted lines,) which travels on the ground and supports that end of the mower.

In some cases it is necessary to elevate or depress the machine. This is done by loosening the screw-bolts that pass through the cap-pieces $c$ and slots $e$ into the curved standard $d$, when the cap-pieces, with the large wheel, $b$, can be raised or lowered, according to circumstances, and thus elevate or depress the machine.

Having thus fully described the nature and construction of my improvements, what I claim therein as new, and desire to secure by Letters Patent, is—

Constructing the platform separate from the other frame-work, as described, so that it can be readily put together or removed and the mower attached, as herein fully described and made known.

ALFRED JAMES PURVIANCE.

Witnesses:
JOHN HAYNE,
ANDERSON I. CHADWELL.